United States Patent [19]

Koncsek

[11] Patent Number: 4,991,795
[45] Date of Patent: Feb. 12, 1991

[54] TWO-STAGE SUPERSONIC INLET

[75] Inventor: Joseph L. Koncsek, Seattle, Wash.

[73] Assignee: The Boeing Company, Seattle, Wash.

[21] Appl. No.: 298,117

[22] Filed: Jan. 17, 1989

[51] Int. Cl.$^5$ .................................................. B64D 33/02
[52] U.S. Cl. .................................. 244/53 B; 137/15.1
[58] Field of Search ........................... 244/53 R, 53 B; 137/15.1, 15.2

[56] References Cited

U.S. PATENT DOCUMENTS

| | | |
|---|---|---|
| 2,997,843 | 8/1961 | Arnett et al. |
| 3,066,892 | 12/1962 | Smith et al. |
| 3,104,522 | 9/1963 | Pennington et al. |
| 3,141,300 | 7/1964 | Turcat .................... 244/53 B |
| 3,295,555 | 1/1967 | James et al. |
| 3,450,141 | 6/1969 | Braendlein . |
| 3,765,179 | 10/1973 | Strang et al. |
| 3,941,336 | 3/1976 | Nangia . |
| 4,025,008 | 5/1977 | Peikert ..................... 244/53 B |
| 4,307,743 | 12/1981 | Dunn . |
| 4,372,505 | 12/1983 | Syberga . |
| 4,620,679 | 11/1986 | Karaniar . |

FOREIGN PATENT DOCUMENTS

| | | |
|---|---|---|
| 1472401 | 1/1967 | France ..................... 244/53 B |
| 899625 | 6/1962 | United Kingdom . |
| 1438769 | 6/1976 | United Kingdom . |

Primary Examiner—Galen Barefoot
Attorney, Agent, or Firm—Seed and Berry

[57] ABSTRACT

A mixed compression inlet having a forward ramp, an aft ramp, and a slot therebetween is disclosed. The aft ramp is coupled to the inlet to permit both fore-aft movement and rotational movement. The geometric throat of the inlet is located at the leading edge of the aft ramp. The slot opens into a plenum chamber. A vent permits air to exit from the plenum chamber. The pressure in the plenum chamber is maintained approximately equal to the pressure on the aft portion of the forward ramp. A servocontroller receiving input from pressure sensors of the forward ramp and in the plenum chamber controls the position of a vent door to ensure that the proper pressure is maintained within the plenum chamber.

22 Claims, 3 Drawing Sheets

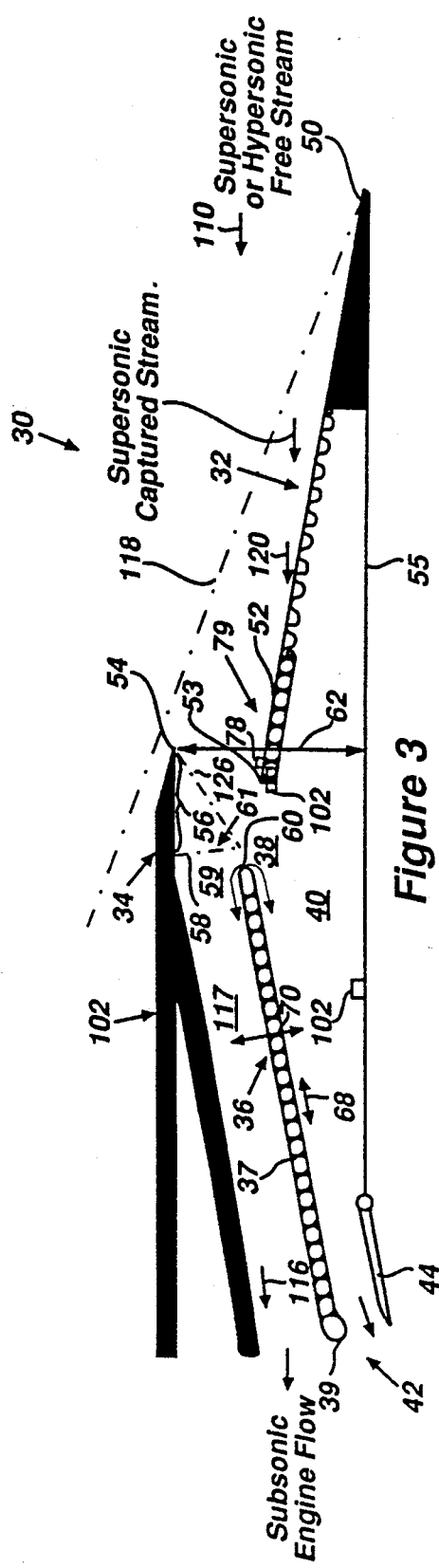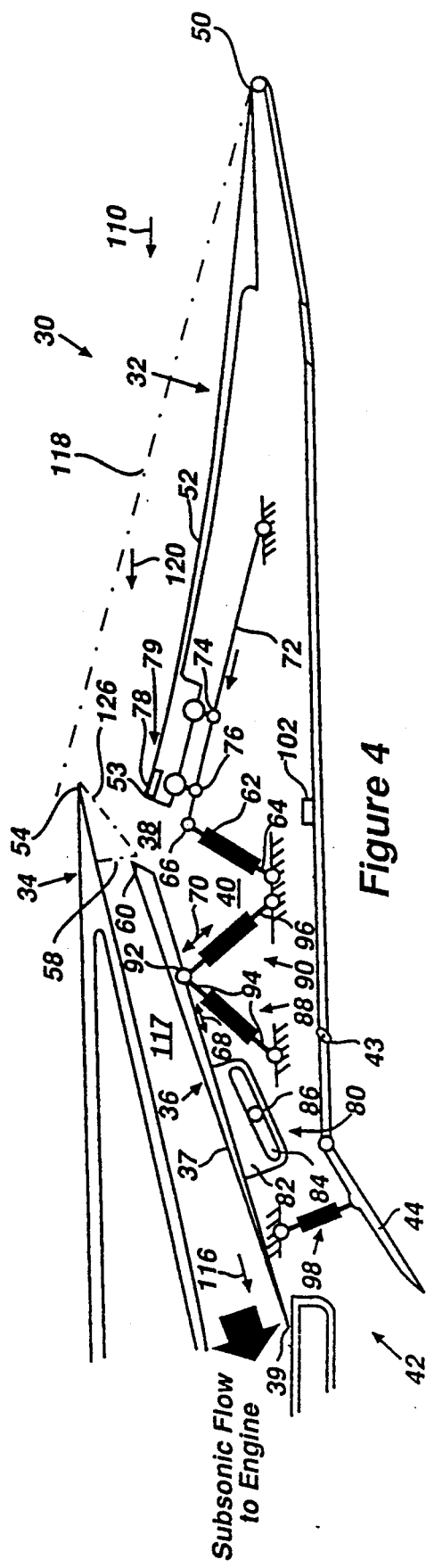

TWO-STAGE SUPERSONIC INLET

FIELD OF THE INVENTION

This invention relates to an inlet for a jet engine, and more particularly, to a mixed compression inlet which is aerodynamically efficient during supersonic and hypersonic flight, resists "unstarting" of the inlet, and is easy to "start" and "restart."

BACKGROUND OF THE INVENTION

An inlet for a supersonic engine must slow the airstream speed from supersonic speeds to the required subsonic speed for the engine. Hypersonic aircraft currently being designed have top operating speeds in the range of Mach 6 to Mach 8 and higher relative to the free airstream. In contrast, the required airstream speed at the aircraft engine intake may be as low as Mach 0.15 for a ramjet at these flight speeds. The shape of the inlet slows the airstream from the supersonic free stream speed to the engine intake speed.

Supersonic inlets fall into two broad categories, external compression and mixed compression inlets. In an external compression inlet, the normal shock wave, i.e., the region in which the airstream transitions from supersonic speed to subsonic speed, is located external of the cowl at approximately the cowl lip of the inlet. The cowl lip aperture is also the geometric throat of the inlet. An external compression inlet is illustrated in U.S. Pat. No. 3,450,141, to Braendlein, incorporated herein by reference. External compression inlets are presently used on most supersonic aircraft, such as the F-14, F-15 and F-18. One advantage of external compression inlets is their stability over a large range of operating conditions. One disadvantage of an external compression inlet is the excessive drag created by the inlet at high Mach numbers.

In a mixed compression inlet, the normal shock wave is located within the inlet duct, aft of the cowl lip. The airstream is slowed from a first supersonic speed to a second, lower supersonic speed by ramps external to the cowl lip. The airstream is still at a supersonic speed when it enters the inlet duct. The geometric throat of the inlet is located aft of the cowl lip, within the inlet duct. Mixed compression inlets are illustrated in U.S. Pat. No. 4,307,743, to Dunn, and British Patent No. 1,438,769, to Brooks, incorporated herein by reference. Mixed compression inlets are presently used on the SR-71, a twin-engine supersonic aircraft.

Mixed compression inlets have the advantage of being more aerodynamically efficient than external compression inlets at high Mach numbers, but also have some disadvantages. A mixed compression inlet has a very narrow range of stable operation. Mixed compression inlets are subject to "unstart," a phenomena in which the normal shock wave moves from the inlet duct to the cowl lip, causing the inlet to function as an external compression inlet. When a mixed compression inlet unstarts, the thrust produced by the engine is significantly decreased and, at the same time, the drag caused by the inlet is significantly increased. The simultaneous decrease in thrust and increase in drag have a drastic effect on the aircraft's flight characteristics. If the aircraft is traveling at high speeds when unstart occurs, the aircraft will rapidly slow down, making control of the aircraft by the pilot difficult or impossible for a period of time. In the SR-71, which has two engines with corresponding inlets, there have been reported examples of one of the inlets unstarting during supersonic flight, causing the aircraft to suddenly spin out of control. Unless the inlet is quickly "restarted," that is, the normal shock is moved from the cowl lip back into the inlet at the geometric throat, the pilot will not be able to regain control of the aircraft.

SUMMARY OF THE INVENTION

It is an object of this invention to provide an inlet which is stable in operation over a wide range of speeds.

It is another object of this invention to provide an inlet which is more aerodynamically efficient than previous inlets.

It is another object of this invention to provide an inlet which is not as susceptible to "unstarting" as previous inlets.

It is another object of this invention to provide an inlet which is significantly easier to start and is significantly easier and quicker to restart in flight if it becomes "unstarted."

These and other objects of the invention are accomplished by providing a mixed compression inlet having an inlet duct, a forward ramp, an aft ramp, a throat region, a cowl and a slot. The forward ramp extends from significantly forward of the cowl to aft of the cowl lip. The aft ramp is within the inlet duct, aft of the cowl lip. The throat region is located at the leading edge of the aft ramp. The slot is located forward of the throat, beginning at the leading edge of the aft ramp.

The airstream is slowed from a first supersonic speed to a second, lower supersonic speed by the forward ramp. At the cowl lip, the airstream enters the inlet duct and is slowed to a still lower supersonic speed. The airstream slows from supersonic to subsonic speed at the throat region, creating a normal shock wave at the leading edge of the aft ramp.

For the most aerodynamically efficient operation, the cross-sectional area of the throat is different at different Mach numbers. Further, the shock wave generated at the cowl lip should approximately intersect the leading edge of the aft ramp. However, over a large range of speeds, the shape of the shock wave generated at the cowl lip varies considerably. The aft ramp is coupled to the inlet to permit both rotational and fore-aft movement of the aft ramp. Having the aft ramp capable of both rotational and fore-aft movement permits the ramp to be positioned for optimum throat size and the leading edge positioned to intersect the shock wave generated by the cowl lip.

The slot opens into a plenum chamber having a vent to the ambient atmosphere. A vent door is provided that is movable to different positions to vary the cross-sectional area of the vent. Pressure sensors are provided for sensing the static air pressure within the plenum chamber and on the trailing edge of the forward ramp. A servocontroller system receiving inputs from the pressure sensors controls the position of the vent door.

Having the slot positioned just forward of the throat region for venting air at selected times provides more stable operation. The static air pressure within the plenum chamber is maintained approximately equal to the static air pressure on the trailing edge of the forward ramp. As the pressure on the forward ramp changes, the position of the vent door is varied to maintain the pressures equal. In the event the normal shock wave begins to move forward of the aft ramp, the subsonic air aft of the normal shock wave enters the plenum chamber through the slot and is exhausted out the vent to prevent the inlet from unstarting. The position of the vent door member is also varied to start or restart the inlet. The slot, plenum chamber, and vent are made sufficiently large to exhaust large quantities of air from the duct to ensure that the inlet does not unstart even though large and sudden changes in air pressure occur.

BRIEF DESCRIPTION OF THE DRAWINGS

FIG. 3 is a schematic of FIG. 1 during operation under transient conditions to prevent unseating or for bypassing air.

FIG. 4 is a schematic of an alternative embodiment of the mixed compression inlet incorporating the invention.

DETAILED DESCRIPTION OF THE INVENTION

Figure 1:
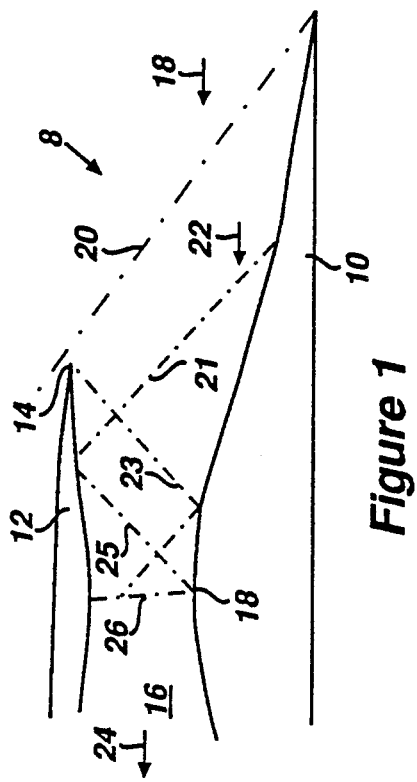
FIG. 1 is a schematic of a prior art mixed compression inlet.

A prior art mixed compression inlet is illustrated in FIG. 1. The mixed compression inlet 8 includes a forward ramp 10, a cowl 12, and a duct 16. The cowl 12 includes a cowl lip 14 at the leading edge. The ramp 10 extends from forward of the cowl lip 14 backward to form a wall of the duct 16. The duct 16 has a geometric throat region 18 at which the duct 16 is the most narrow.

The aircraft on which the inlet 8 is mounted is normally traveling at supersonic speeds. Free stream air external to the inlet represented by arrow 18 is traveling at supersonic speeds relative to the inlet. The free stream air is captured and initially slowed from a first supersonic speed to a second supersonic speed by the leading edge of the ramp 10. A bow shock wave 20 extending from the leading edge of the ramp 10 represents the transition of the airflow from free stream hypersonic air to captured air at a slower supersonic speed. The captured air 22 is further slowed by the ramp 10 to lower speeds. Preferably, the cowl lip 14 intersects the bow shock wave 20 or is just aft of the shock wave, forcing the captured air into the duct 16. Additional shock waves 21, 23 and 25 within the duct 16 further slow the captured airflow 22. Normal shock wave 26 is located where the air transitions from supersonic flow 22 to subsonic flow 24. When the inlet is started, the normal shock 26 is just downstream of the geometric throat 18 of the mixed compression inlet.

A significant disadvantage of prior art mixed compression inlets is the difficulty of maintaining stable operation. A normal shock wave is stable in a diverging duct but is unstable in a converging duct. In the event of a sudden increase in the pressure of the subsonic flow 24 or a change in engine operating parameters or external air pressure, the normal shock 26 may move forward of the geometric throat 18, into the converging portion of the duct. Once the normal shock 26 moves slightly forward of throat 18, it is in a converging duct, is unstable, and rapidly moves out of the duct to the edge of the cowl lip 14, unstarting the inlet. In the event the inlet "unstarts," the thrust provided by the engine significantly decreases while the drag of the inlet significantly increases, greatly slowing the aircraft down.

To regain stable and efficient operation, the inlet must be restarted very quickly, i.e., the normal shock 26 must be moved from the cowl lip 14 back to a point downstream of the geometric throat 18. If the inlet is not restarted, the aircraft may be very inefficient or even uncontrollable.

Attempts have been made in the prior art to increase the range of stable operation and minimize the chances of the inlet unstarting. For example, various air bleed devices, movable ramps, or a movable conical spike have been provided to increase the range of stable operation and restart the inlet once it has unstarted. A disadvantage of using movable ramps or spikes in the airflow to prevent unstart and for restarting is the time required to move them to a new position. A further disadvantage is the excessive weight and mechanical complexity required for moving a ramp or a conical spike the distance required very quickly to restart an inlet.

A mixed compression inlet 30 incorporating features of the invention is illustrated in FIGS. 2-5. The inlet 30 is coupled to an aircraft forward of the engines. The inlet 30 includes a forward ramp 32, a cowl 54, an aft ramp 36, and a duct 117. A slot 38 is provided between the forward ramp 32 and the aft ramp 36. The slot 38 opens to a plenum chamber 40 having a vent 42. A vent door 44 is movable to vary the quantity of air permitted to exit through vent 42.

The forward ramp 32 includes a leading edge 50, a ramp face 52, an aft portion 79 and a trailing edge 53. The trailing edge 53 of ramp 32 is located aft of the leading edge of cowl 54 in a vertical plane. A plane extending perpendicular to the ramp surface 52 at the trailing edge 53 approximately intersects the cowl lip 54.

The forward ramp 32 is movable to a variety of positions or angles with respect to the cowl 34, as is known in the art. For example, the ramp may include a single-piece, flexible ramp portion to provide isentropic compression of the air over a range of Mach numbers, as described in U.S. Pat. No. 3,450,141, to Braendlein, incorporated herein by reference. The forward ramp 32 may be hinged at a plurality of locations to provide compression and slowing of the supersonic flow as required. Alternatively, the forward ramp 32 may be hinged at the leading edge 50, the entire ramp being movable, as shown in U.S. Pat. No. 4,307,743, to Dunn.

The forward ramp 32 is movable to a desired position by a conventional mechanical actuator 62, as shown in FIG. 4. The mechanical actuator 62 may increase or decrease the length of extending rod 64 to vary the position and shape of the forward ramp 32. The mechanical actuator 62 is pivotally coupled at joint 66 to support shaft 72. The forward ramp 32 is slidably coupled to support shaft 72 through linkages 74 and 76.

The forward ramp 32 includes a static air pressure sensor 78 at the aft portion 79 of the forward ramp. The static air pressure along the aft portion of forward ramp 32 is provided to a central controller (not shown).

Figure 2:
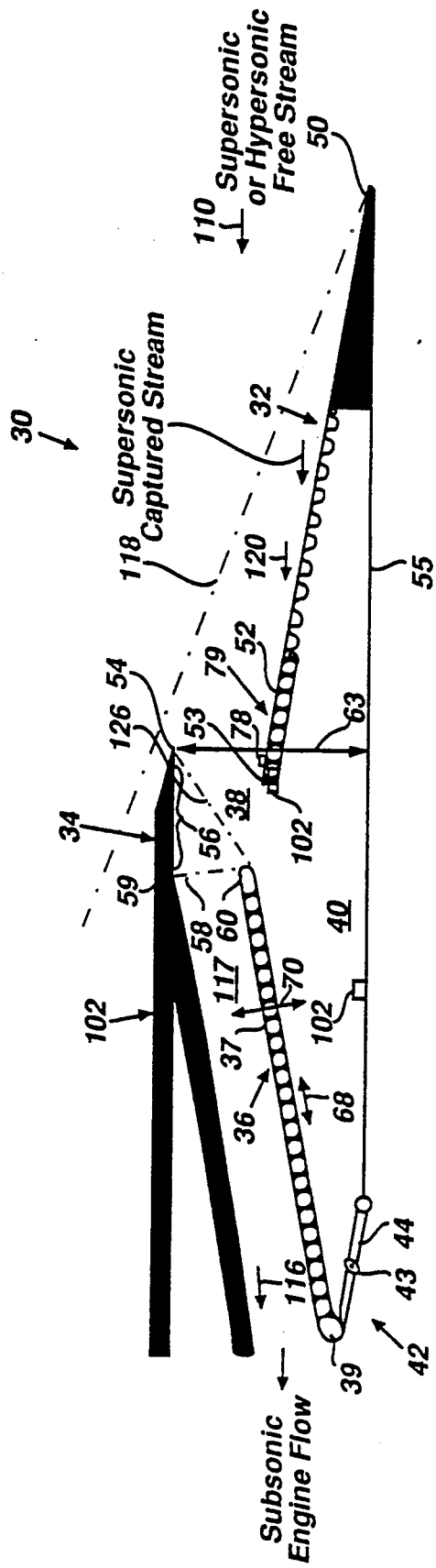
FIG. 2 is a schematic of a mixed compression inlet incorporating the invention.

The cowl 34 includes a cowl lip 54 and a supersonic diffusing portion 56. The supersonic diffusing portion 56 is that portion of the cowl 34 over which the airflow is slowed to a low supersonic speed, to minimize normal shock losses. The supersonic diffusion region begins at the cowl lip 54 and ends at the normal shock 58. The cowl 34 may be a curved cowl, as shown in FIG. 2, or a horizontal external cowl, as shown in FIG. 4. Use of a horizontal external cowl minimizes cowl drag and provides more aerodynamically efficient operation. The inlet has a lip height 63 defined as the vertical distance from the cowl lip 54 to a horizontal plane 55 extending from the leading edge 50 of the forward ramp 32, as shown in FIG. 2. The lip height 63 represents the maximum cross-sectional area of the free stream air which the inlet may capture. Preferably, the supersonic diffuser 56 should be as short as possible at high operating speeds to minimize weight and boundary layer control requirements.

The aft ramp 36 is coupled to the internal structure of the inlet 30. The aft ramp 36 includes a leading edge 60, a ramp surface 37, and a trailing edge portion 39. The aft ramp 36 is coupled to the inlet to permit the ramp to both rotate and move fore or aft. A throat region 59 is formed in the duct 117 at the leading edge 60 of the aft ramp.

As shown in FIG. 4, mechanical actuators 88 and 90 are coupled to the ramp 36 to drive it fore or aft, as indicated by arrow 68, and/or rotate it as indicated by arrow 70. A suitable coupling 80 for permitting both fore-aft and rotational motion is a support member 82 having a slot 84 therein mounted on a support pin 86. Mechanical actuator 88 includes extendable and retractable rod 94, and mechanical actuator 90 includes extendable and retractable rod 96. The mechanical actuators may extend and retract the respective rods 94 and 96 independent of each other or in cooperation with each other. The aft ramp 36 may move with fore-aft motion, a translational motion, rotational motion, or combined translational and rotational motion simultaneously.

The cross-sectional area of the throat 59 is variable. In the preferred embodiment, the throat size is varied by changing the position of the leading edge 60 of the aft ramp 36. Moving the aft ramp leading edge 60 forward or rotating the aft ramp counterclockwise about support pin 86 reduces the throat size. Moving the aft ramp leading edge 60 backward or rotating the aft ramp 36 clockwise about support pin 86 increases the throat size. Preferably, the aft ramp rotates counterclockwise simultaneously as it moves forward and rotates clockwise simultaneously as it moves backward. Other methods of varying the throat size, such as changing the internal shape of the cowl, moving the cowl, or the like, may be used.

The slot 38 just forward of the throat region 59 opens into a plenum chamber 40. The slot 38 extends from the trailing edge 53 of the forward ramp 32 to the leading edge 60 of the aft ramp 36. The trailing edge of the forward ramp is positioned where a perpendicular line extending from the trailing edge intersects the cowl lip. The leading edge 60 of the aft ramp is positioned approximately where the cowl shock wave 126 impinges on the aft ramp. The slot is thus approximately the same length as the supersonic diffuser.

The cross-sectional area of the slot is greater than that of the throat. Because the slot is defined in part by the leading edge 60 of the aft ramp 36, as the position of the aft ramp changes, the size of the slot also changes. Even though the slot may decrease in size, the throat also decreases in size and the slot remains larger than the throat. It is not necessary that either the throat size or the slot size be variable to provide the stable operation of a mixed compression inlet according to the invention. However, having a variable throat size increases the aerodynamic efficiency of the inlet over a wide range of speeds.

The plenum chamber 40 includes a vent 42 opening into the free stream air surrounding the inlet. The cross-sectional area of the opening is determined by the position of vent door 44. The position of the vent door 44 is controlled by mechanical actuator 98. The vent door 44 may be completely closed, sealing the plenum chamber 40, as shown in FIG. 2, or may be opened a selected amount, as shown in FIGS. 3 and 4.

A precision vent 43 for venting small and exact quantities of air from the plenum chamber is provided to fine tune the pressure to a desired value. The vent 43 may be located within the vent door 44 as shown in FIG. 2 or at a separate location as shown in FIG. 4. A vent control that has a rapid response time and is capable of exhausting exactly controllable quantities of air is suitable for use as the vent 43. The vent 43 may be a fluidic device, such as shown in U.S. Pat. No. 3,645,676 to Limmage et al., incorporated herein by reference. A fluidic vent is preferred because there are no mechanically moving parts, it is exactly controllable and has a very rapid response time. The vent 43 may be controlled by the same servocontroller system that controls vent 42. A separate control system and method may be used if desired. Alternatively, the vent 43 may be a control valve, mechanically actuated vent or other suitable device.

The plenum chamber 40 includes one or more air pressure sensors 102. The air pressure sensors may be located on the underside of the forward ramp 32 on aft ramp 36, on the mechanical actuators or on a wall of the plenum chamber, as shown in FIGS. 2 and 4. The pressure sensors 102 provide the static air pressure within the plenum chamber 40 to a central control system (not shown).

In a preferred embodiment, the cross-sectional are of the vents 42 and 43 are controlled by a servocontroller. The servocontroller receives inputs from pressure sensors 78 and 102 via the central control system. The position of the vent door 44 is controlled by the servocontroller to ensure that the static pressure on the aft portion of the forward ramp 32 is approximately equal to the static pressure within chamber 40. In the event the pressure in plenum chamber 40 is above that on the aft portion of ramp 32, vent 42 or 43 is opened, permitting some of the air in the plenum chamber 40 to exhaust to the atmosphere, thus lowering the pressure in the plenum chamber to a selected value. The vent door 44 may be held open a predetermined amount at all times to maintain the selected pressure in the plenum chamber if necessary, depending on flight conditions.

The large vent door 44 provides a coarse adjustment to maintain the plenum chamber air pressure at approximately the desired value. The precision vent 43 exhaust only small quantities of air and provides a fine adjustment to maintain the air pressure closer to the desired value. The small precision vent 43 preferably has a fast response time to permit the air pressure in the plenum chamber to change very rapidly, substantially simultaneously with changes in air pressure on the forward ramp. The precision vent 43 permits the plenum chamber air pressure to track the forward ramp air pressure exactly for small changes in air pressure as will normally occur while cruising. The inlet will operate according to the invention without the smaller, precision vent 43, as shown the embodiment of FIG. 5. However, use of such a vent 43 increases the efficiency of the inlet and control of the airflow to optimize flight conditions.

When the vent door 44 is opened its maximum amount, the cross-sectional area of the vent is greater than the cross-sectional area of the slot. Under normal operating conditions, the cross-sectional area of the slot is larger than the cross-sectional area of the vent opening 42 because the vent door 44 is partially or completely closed. Usually, the cross-sectional area of the vents 42 and 43 exhausting air is small because the vent door 44 is closed or only slightly opened to maintain the selected pressure in plenum chamber 40 while the size of the slot 38 remains unchanged or varies only slightly as the ramps 36 and 32 are moved. However, to ensure stable operation of the inlet is maintained under all operating conditions, and to ensure that the inlet does not unstart, the vent 42 has an area approximately equal to or greater than the slot 38.

In an alternative embodiment, the vent door 44 may be a spring-biased, passive device. A spring member having the desired strength, resiliency and spring constant maintains the vent closed with the pressure in plenum chamber 40 below a selected value and permits the vent door to open a predetermined amount based on given air pressure within plenum chamber 40. As the pressure in plenum chamber 40 increases, the spring member permits the vent door 44 to open, increasing the airflow through the vent 42 to maintain the pressure within a desired range.

The operation of the inlet 30 is as follows. Free stream air, represented by arrow 110, enters the inlet duct 117 and, after being captured and slowed to a desired speed, enters the jet engine, represented by airflow arrow 116. While the plane is traveling at subsonic speeds, there is no normal shock. As the plane's speed increases to exceed the speed of sound, a normal shock 58 is created where the airflow transitions from supersonic to subsonic speeds. When the aircraft speed first increases to above the speed of sound, the normal shock is generally located externally of the inlet at the cowl lip 54. The inlet 30 is not as aerodynamically efficient when the inlet has not yet been started, i.e., the normal shock is located at the cowl lip 54, and is not yet within the duct 117. While the aircraft is traveling at supersonic speeds, the inlet is "started." "Starting the inlet" refers to moving the normal shock to the throat region 59 in the inlet duct 117. The inlet is started by opening vent door 44. When vent door 44 is opened, the pressure in plenum chamber 40 drops as excess air exits through the vent 42. The drop in pressure causes the normal shock 58 to enter the duct 117 and move to the geometric throat 59 formed at the leading edge 60 of ramp 36. When the normal shock 58 is located at the geometric throat 59 of duct 117, the inlet is started. The vent door is then completely or partially closed after the inlet has started.

As the aircraft flies at supersonic speeds, a bow shock wave 118 is created by the leading edge 50 of the forward ramp 32. Air within the bow shock wave 118 is captured by the inlet and slows from a first supersonic speed to a second, slower supersonic speed, as represented by airflow arrow 120. For the most aerodynamically efficient operation, a maximum amount of the captured air 120 is channeled into the inlet duct 117 for use by the engines, the bow shock wave approximately intersecting the cowl lip. As the speed of the aircraft varies over a wide range of Mach numbers, for example, from Mach 1 to Mach 6, the shape of the bow shock wave changes considerably for a given position and shape of ramp 32. The forward ramp 32 may change shape and position to cause the bow shock wave 118 to approximately intersect the cowl lip 54.

A cowl shock wave 126 extends from the cowl lip 54 as the airflow 120 is slowed to a lower supersonic speed. The cowl shock 126 preferably passes approximately at the leading edge 60 of the aft ramp 36 for the most aerodynamically efficient operation to ensure that most or all of the air slowed down by the cowl shock wave 126 enters the engine. In practice, to ensure stable operation, the leading edge 60 is positioned slightly aft of the cowl shock wave 126. The shape and position of the cowl shock wave 126 changes as the speed of the aircraft varies over a range of Mach numbers. The aft ramp 36 is moved forward or backward as the shape of the shock wave 126 changes to position the leading edge 60 to approximately intersect the cowl shock wave 126. When the aircraft is traveling at higher speeds, the aft ramp 36 is positioned further forward than at lower speeds.

The normal shock wave is located approximately at the duct geometric throat 59, which is at the leading edge 60 of the aft ramp 36. The throat size for the most efficient operation varies as the speed changes over a range of Mach numbers. The aft ramp 36 can be pivoted about support pin 86 to permit the leading edge 60 to increase or decrease the size of the throat 59. The throat should be smaller for higher speeds than it is for lower speeds.

Figure 5:
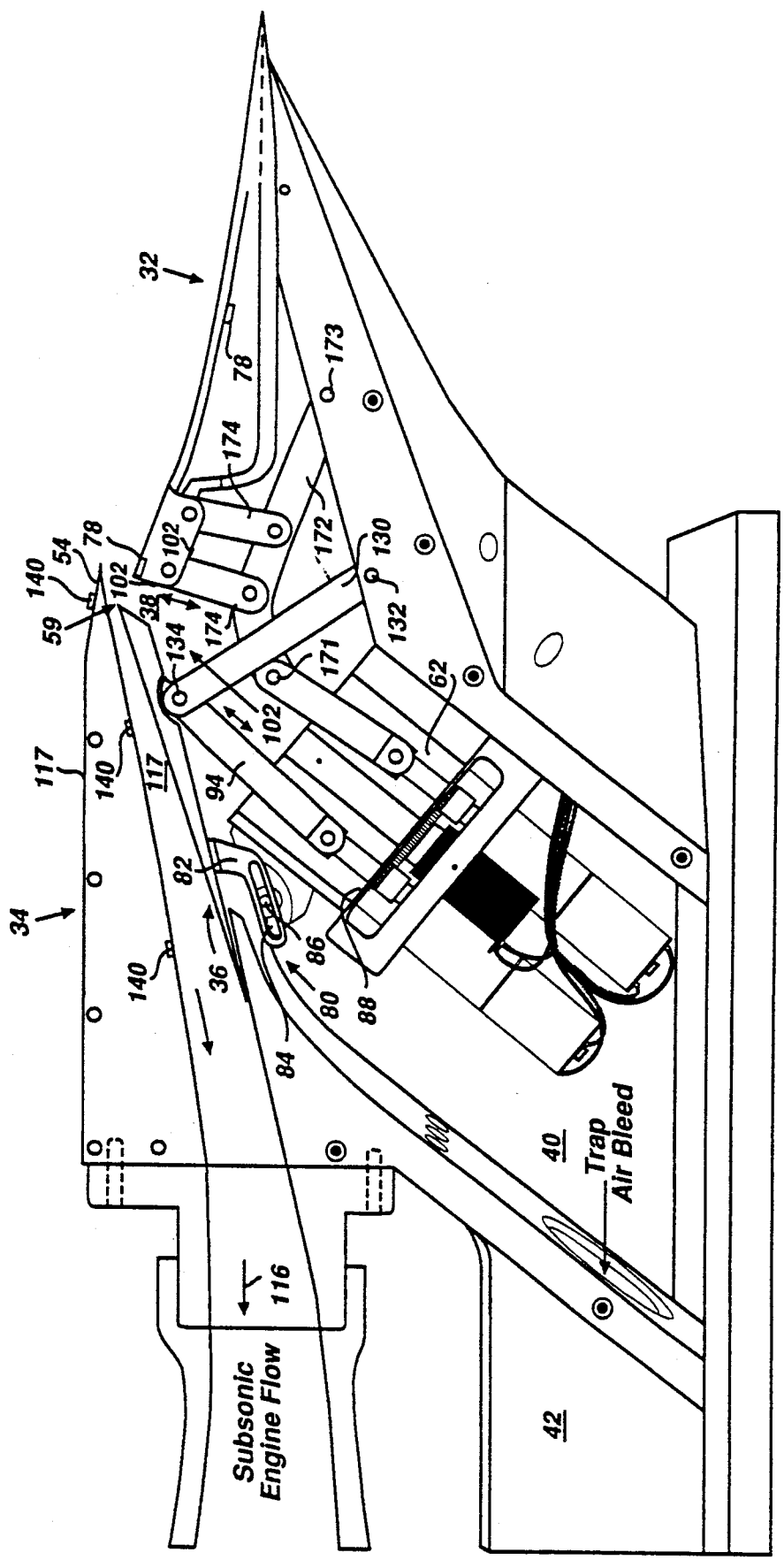
FIG. 5 is a cross-sectional view of an alternative embodiment of an inlet incorporating the invention.

In the embodiment of FIG. 4, the aft ramp 36 can be pivoted without varying its fore and aft position. Further, the aft ramp 36 may move fore and aft without being pivoted, if desired. The pivoting motion and fore and aft motion are independent of each other since actuators 88 and 90 may be moved independently. In the embodiment of FIG. 5, the pivoting motion and fore and aft motion are interrelated. As the aft ramp 36 is moved fore and aft, it simultaneously pivots a predetermined distance to vary the throat size.

The air pressure in plenum chamber 40 is maintained at the proper pressure level to cause the captured air 120 to remain within the duct 117. The static air pressure at the aft region of the forward ramp 32 is sensed by pressure sensor 78. The static pressure in the plenum chamber 40 is held approximately equal to the pressure at the aft portion of the ramp 32. Maintaining the pressure in plenum chamber 40 equal to the air pressure on the aft portion of forward ramp 38 effectively extends the length of the forward ramp 32 across the slot 38 to the leading edge 60 of aft ramp 36. The slot 38 forms one wall of the duct 117 during normal supersonic operation. The air pressure in the plenum chamber causes the airflow into the engine to extend smoothly across the slot, as though the slot were a solid wall between the ramps 32 and 36. See, for example, page 2, lines 34-39, of British Patent No. 1,438,769. In the event the air pressure along the aft portion of forward ramp 32 decreases, the drop in pressure is sensed by sensor 78 and the servocontroller causes the pressure in plenum chamber 40 to decrease by opening vent door member 44 to permit air to exhaust out the vent 42 until the pressure is at the desired level. Vents 42 and 43 are opened or closed as needed to maintain the desired pressure within plenum chamber 40 to permit the slot 38 to form a wall of the inlet duct during normal operation.

FIG. 3 illustrates the normal shock forward of the throat 59 but air is entering the slot, preventing the inlet from unstarting and maintaining the normal shock within the duct 117. In the event of a rapid change in flight conditions, the airflow rates 116 and 120 may change rapidly or the pressure in the duct 117 may suddenly change. For example, the engine may suddenly be slowed down by the pilot, causing the airflow 116 to rapidly change and a large pressure to build up, beginning at the engine and moving forward, within the duct 117. The pressure tends to force the normal shock 58 forward of the geometric throat 59 towards the cowl lip 54, as shown in FIG. 3. As the normal shock moves forward of the aft ramp leading edge 60, subsonic airflow exists within the slot 38. Subsonic airflow behind the normal shock 58 has a significantly higher pressure than supersonic flow forward of normal shock 58. The subsonic flow, being at a higher pressure than the air in the plenum chamber 40, enters through slot 38 into the plenum chamber 40. The slot 38 is made relatively large to permit huge quantities of subsonic air 116 to enter the plenum chamber 40.

The pressure in plenum chamber 40 is maintained approximately equal to the pressure of the supersonic flow 120 on the aft portion of ramp 32. Because the air pressure in the subsonic flow is higher than in the supersonic flow, the subsonic flow automatically enters the plenum chamber 40 without any changes in the mechanical structure of the inlet or vent being required. The slot 38 does not act as a smooth wall with respect to the higher pressure subsonic air, but rather permits the air to enter the plenum chamber 40. For a brief transitional period, the plenum chamber 40 acts as a storage tank into which the subsonic air enters. The air is compressed within the plenum chamber 40, the plenum chamber acting to absorb a significant quantity of air from the subsonic flow. As the pressure in the plenum chamber 40 increases due to the entry of the subsonic air, vent door 44 opens to permit air to exit through vent 42 to maintain the desired pressure within plenum chamber 40. The area of vent 42 is variable over a wide range, and is, at its maximum, approximately equal to or greater in area than the slot 38 to permit huge amounts of the high pressure air to exit through the vent 42. Further, the vent door 44 has a relatively fast response time, i.e., faster than the movement of ramps 32 and 36, to prevent unstarting of the inlet.

During a transitional period, the normal shock wave 58 is positioned within the slot 38, the aerodynamic throat 61 being located forward of the geometric throat 59, as shown in FIG. 3. Opening vent door 44 to release the subsonic flow prevents the normal shock 58 from moving forward within the duct 117 towards the cowl lip 54 and causes it to move back to the geometric throat 59. Even if the aerodynamic throat 61 is maintained within the slot 38 for more than a brief transition period, the normal shock wave 58 is aerodynamically in a diverging flow. Stable operation of the inlet will be maintained and the inlet will not unstart.

Generally, the normal shock 58 will remain within the slot 38 at an aerodynamic throat 61, which is different from the geometric throat 59 only for very short, transitional periods. As the air pressure within plenum chamber 40 is lowered by large amounts of air exiting through vent 42, the low air pressure behind the normal shock wave 58 causes it to move into the throat region 59 within duct 117. If the sudden change in flight conditions was merely transient, such as may be caused by the aircraft's suddenly entering a very low pressure region of external air, an air bubble in the fuel line, or the like, the normal shock wave will quickly return to its correct position within the duct 117 and the ramps 32 and 36 will remain in their same position. However, if the change in flight conditions lasts longer, for example, a significant change in the speed of the aircraft from a fast speed to a much lower speed, the position of the ramps 32 and 36 will change over the next few seconds to provide aerodynamically efficient engine operation at the new speed, with a different air pressure being maintained in plenum chamber 40 based on the new flight conditions.

When the inlet has not yet been started and subsonic flow exists across the slot 38, it is, of course, possible to maintain a pressure in plenum chamber 40 which permits the slot 38 to appear as a smooth wall to subsonic flow. The pressure maintained in plenum chamber 40 may be any desired value, but, as explained herein, during normal operating conditions, a pressure approximately equal to that on the ramp 32 is preferred.

A significant advantage of providing a slot 38 forward of the normal shock wave is the fast response time provided to control transients and prevent unstarting. Because the air pressure of the subsonic air is significantly higher than supersonic air, the subsonic air automatically enters the plenum chamber 40 as soon as the normal shock 58 begins to move forward, even though sufficient time has not yet passed for vents 42 and 43 to open wider. The air escaping into the plenum chamber 40 immediately behind the normal shock 58 pulls it aft towards the geometric throat to aid in maintaining it in the correct position. If the door 44 is partially open, more air will automatically escape because the pressure has increased. Maintaining the pressure in plenum chamber 40 at a pressure well below the pressure of the subsonic air, and preferably approximately equal to the air pressure on the aft portion of forward ramp 32, provides stable operation of the inlet even though a variety of transients may occur in the airflow to the engines. Because air is compressible, the plenum chamber 40 can absorb some of the high pressure air to prevent the normal shock 58 from moving external to the inlet until the door 44 has sufficient time to open wider and permit the excess air to exhaust through vent 42. The response time of the door 44 is fast enough to ensure that sufficient air can exit prior to the normal shock 58 moving external to the inlet, causing the inlet to unstart. Use of pressure sensors 78 and 102, having a fast response time, in conjunction with a servocontroller having a fast response time ensures the release of pressure in plenum chamber 40 prior to the normal shock 58 being blown out of the inlet, causing the inlet to unstart.

The plenum chamber 40 may be relatively large, depending on the inlet and engine design and transients which may be encountered to permit significant volumes of air to be absorbed during the time vent door 44 is not yet open. Alternatively, if the vents 42 and 43 and associated servocontroller and pressure sensors have an extremely fast response time, the plenum chamber 40 may be made relatively smaller and still provide sufficient cushion to ensure that the inlet does not unstart.

In the embodiment in which the vent door 44 is spring biased shut, a fast response time is achieved without the need for pressure sensors or servocontroller. In the embodiment which utilizes a spring biased door 44, the increase in air pressure in plenum chamber 40 automatically causes the door 44 to open further, permitting the excess air to exhaust through vent 42. The normal shock 58 is then moved aft, to the throat 59, and stable operation is maintained.

The vent 40 may also be used to bypass excess air captured by the inlet to improve engine aerodynamic efficiency if desired. At Mach 6, the engine requires larger amounts of air then at Mach 2 or 3. If the inlet is designed to take in sufficient air for operation at Mach 6, there may be excess air in the inlet when the aircraft is travelling at Mach 2 or 3. Some prior air devices bypass the excess air just prior to the engine, after significant work has been performed by the inlet. Using the structure of this invention, the excess air is exhausted out of vent 42, through slot 38. To bypass air, the pressure in the plenum chamber 40 is decreased, causing air to enter the slot and exit through the vent 42. The aerodynamic throat may move slightly forward to be within the slot 38, permitting some subsonic air to exit as bypass air as well. The inlet may be operated with supersonic or subsonic bypass air exiting through the slot for long periods of time if desired.

An alternative method of bypassing air other than decreasing the pressure in the plenum chamber is to rotate the aft ramp leading edge 60 upward or move it aft so that the cowl shock wave 126 passes well ahead of the leading edge 60. With the leading edge 60 well aft of the cowl shock wave 126, the airflow is divided by the aft ramp 36 and the amount desired to be bypassed is channeled into the plenum chamber, aft of the cowl shock wave 126. Because the air pressure aft of the shock wave 126 is greater than that on the trailing edge of the forward ramp, a desired amount of air can be bypassed while maintaining a pressure in the plenum chamber approximately equal to that on the trailing edge of the forward ramp.

The slot may also bleed off boundary layer air which builds up on the forward ramp using either or both techniques used to exhaust bypass air. With the leading edge 60 in the preferred position, just approximately intersecting the cowl shock wave 126 but just slightly aft thereof, some air will usually be entering the slot. The amount of air entering, whether as boundary layer air, bypass air, or the like can be varied by changing the position aft the ramp 36 or by decreasing the pressure in the plenum chamber.

Starting and restarting of the inlet is easily and quickly accomplished according to the present invention. To start the inlet, the vent door 44 is opened to cause the pressure in plenum chamber 40 to drop as air exits through vent 42. The low pressure air causes the normal shock 58 to enter the duct 117. After the normal shock has entered the duct, the area of vent 42 is decreased, increasing the pressure in the plenum chamber 40 and moving the normal shock to the stable operating position at the geometric throat 59. If the inlet does "unstart," restarting is quickly accomplished following the same steps as for starting. Restarting is thus very quick and easy, compared to restarting of inlets in the prior art.

FIG. 5 illustrates a cross-sectional view of an inlet according to the invention in which a rod 130 replaces actuator 90. The rod 30 is pivotally coupled to the inlet at one end 132 and to the aft ramp 36 at the other end 134. The aft ramp 36 is coupled to the inlet 30, having a slot 84 over a pin 86, permitting simultaneous fore-aft movement and rotational movement of the aft ramp. As the mechanical actuator 88 moves the rod 94 backwards and forwards, the rod 130 causes the aft ramp 36 to rotate about pin 86 the a selected distance to provide a throat of a predetermined size. The relative lengths of rods 94 and 130 are selected to rotate the ramp 36 a desired amount as it is moved fore-aft a selected distance.

In the embodiment of FIG. 5, the forward ramp actuator 62 is pivotally coupled to support bar 172 at joint 171. The bar 172 is pivotally coupled to the inlet of end 173. The rods 174 are pivotally coupled at both ends, alleviating the need for the support structure to slide along the support bar 172. Mechanical actuator 62 moves the forward ramp 32 to a desired location for an aerodynamically efficient bow shock wave with respect to cowl lip 54. Air pressure sensors 78 may be located at numerous positions along the forward ramp 32 to provide accurate measurement of the supersonic airflow at various locations, if desired. Air pressure within plenum chamber 40 is sensed by a plurality of sensors 102 positioned at a variety of positions to ensure accurate measurement. The slot 38 has a cross-sectional area significantly larger than the throat, approximately one-and-one-half to two times larger than the cross-sectional area of duct 117 at the throat 59. The slot 38 is thus relatively large and permits large amounts of air to exit, if necessary. The vent 42, in the completely open position, has approximately two or three times the cross-sectional area of the slot 38. While the vent 42 may be made approximatly equal in cross-sectional area to the slot 38, use of a larger vent member ensures that large quantities of air can be exhausted rapidly from the plenum chamber 40 to prevent the normal shock wave from moving external to the cowl 54 and unstarting the inlet. Use of a large vent increases the range of stable operation. With a large capacity plenum chamber and vent, the inlet has virtually an unlimited range of stable operation. The position of vent door 44 (not shown in FIG. 5) is controlled by a servocontroller receiving inputs from selected pressure sensors 78 and 102. The operational features and advantages obtained by the embodiment of FIG. 5 are similar to those previously described with respect to FIGS. 2-4, and need not be repeated here.

While the inlet has been described with respect to preferred embodiments, equivalent structure performing the same function will be obvious to those of ordinary skill in the art and falls within the scope of this invention.

I claim:

1. An inlet having an inlet duct for an aircraft engine, comprising:
   a cowl having a cowl lip, said cowl forming a wall of said inlet duct;
   a forward ramp having a leading edge positioned forward of said cowl lip and a trailing edge extending aft of said cowl lip;
   a aft ramp positioned within said inlet duct aft of said cowl lip;
   a throat region within said duct at a leading edge of said aft ramp;
   means for simultaneously rotating and moving said aft ramp fore and aft for varying the cross-sectional area of said throat simultaneously with changing the location of said throat within said duct;
   a slot opening into a plenum chamber, said slot being positioned forward of said leading edge of said aft ramp;
   a vent coupled to said plenum chamber to vent air from said plenum chamber to ambient air;
   a vent door means for varying the cross-sectional area of said vent opening to control the quantity of air exiting from said plenum chamber through said vent;

a pressure sensor for sensing the air pressure within said plenum chamber; and a vent door control means for selectively controlling the pressure within said plenum chamber by varying the position of said vent door, said vent door control means receiving an input from said pressure sensor.

2. The apparatus according to claim 1, further including means for moving said ramp in fore-aft translation.

3. The apparatus according to claim 1 wherein said selected pressure is approximately equal to the static air pressure at said trailing edge of said aft ramp.

4. The apparatus according to claim 1, further including a pressure sensor for sensing the static air pressure adjacent said trailing edge of said forward ramp, said forward ramp pressure sensor providing said forward ramp pressure to said vent door control means for positioning said vent door to equalize the static air pressure on said forward ramp trailing edge and the static air pressure in said plenum chamber.

5. The inlet according to claim 1, further including a second vent within said plenum chamber, said second vent being significantly smaller than said vent, said vent providing a course approximation of the desired pressure in said plenum chamber and said second vent providing a fine tune adjustment of the desired pressure in the plenum chamber.

6. The apparatus according to claim 1 wherein the maximum cross-sectional area of said vent is greater than the cross-sectional area of said slot.

7. The apparatus according to claim 1 wherein said slot has a cross-sectional area greater than said throat.

8. The apparatus according to claim 1 wherein the cross-sectional area of said slot varies when said aft ramp is moved.

9. The apparatus according to claim 1, further including means for varying the position of said forward ramp trailing edge, the cross-sectional area of said slot changing as the position of said forward ramp trailing edge is varied.

10. The apparatus according to claim 1 wherein said means for simultaneously rotating and moving said aft ramp fore and aft includes a plurality of rigid support arms pivotally coupled to said aft ramp, said arms being coupled to said aft ramp at different angles than each other.

11. An inlet for an aircraft engine, comprising:

a cowl having a cowl lip;

a forward ramp having a leading edge positioned forward of said cowl lip and a trailing edge positioned aft of said cowl lip;

a pressure sensor means for sensing the static air pressure adjacent said forward ramp trailing edge;

an aft ramp having a leading edge aft of said cowl lip, a throat region being formed between said cowl and said aft ramp;

a slot forward of said throat region;

a plenum chamber means coupled to said slot for retaining air exiting through said slot; and a sensor for sensing the static air pressure in said plenum chamber;

a vent means for maintaining the static air pressure in said plenum chamber approximately equal to the static air pressure adjacent said forward ramp trailing edge.

12. The apparatus according to claim 11, further including:

a servocontroller for controlling the cross-sectional area vent means, said servocontroller receiving inputs from said forward ramp pressure sensor means and said plenum chamber sensor means and maintaining said respective pressures approximately equal by varying the cross-sectional area of said vent.

13. The apparatus according to claim 11, further including means to vary the cross-sectional area of said throat region.

14. The apparatus according to claim 13 wherein said means to vary the cross-sectional area of said throat region includes means to move said aft ramp leading edge.

15. The apparatus according to claim 11 wherein the cross-sectional area of said slot exceeds the cross-sectional area of said vent.

16. The apparatus according to claim 11 wherein the maximum possible cross-sectional area of said vent exceeds the cross-sectional area of said slot.

17. The apparatus according to claim 11 wherein said means for controlling said static air pressure further includes a second vent smaller than said first vent to permit said air pressure to be more accurately controlled.

18. The method of providing air to an aircraft engine, comprising:

channeling air into a duct as said aircraft flies through the air, said duct including a throat region, a slot forward of said throat region opening into a plenum chamber, and a ramp forward of said slot;

sensing the static air pressure on said forward ramp;

sensing the static air pressure in said plenum chamber; and comparing said forward ramp static air pressure to said plenum chamber static air pressure.

selectively exhausting air from said plenum chamber to maintain the static air pressure in said plenum chamber approximately equal to the static air pressure on said forward ramp.

19. The method according to claim 18, further including the step of varying the cross-sectional area of said throat region by moving a ramp positioned aft of said slot.

20. The method according to claim 18 wherein said aft ramp is simultaneously rotated and moved fore-aft.

21. The method according to claim 18, further including the step of exhausting of air from said plenum chamber to start said inlet.

22. The method according to claim 18 wherein said maintaining step includes:

increasing the cross-sectional area of a vent means for exhausting air out of said plenum chamber when said plenum chamber static air pressure exceeds said forward ramp static air pressure;

decreasing the cross-sectional area of said vent means when said plenum chamber static air pressure is less than said forward ramp static air pressure;

holding the cross-sectional area of said vent means constant when said plenum chamber static air pressure is approximately equal to said forward ramp static air pressure.

* * * * *

UNITED STATES PATENT AND TRADEMARK OFFICE
CERTIFICATE OF CORRECTION

PATENT NO. :   4,991,795
DATED      :   February 12, 1991
INVENTOR(S):   Joseph L. Koncsek It is certified that error appears in the above-identified patent and that said Letters Patent is hereby corrected as shown below:

In column 12, claim 1, line 54, please delete "a" and substitute therefor --an--.

Signed and Sealed this

Thirtieth Day of June, 1992

Attest:

DOUGLAS B. COMER

*Attesting Officer*   Acting Commissioner of Patents and Trademarks